(12) United States Patent
Kang

(10) Patent No.: US 11,343,483 B2
(45) Date of Patent: May 24, 2022

(54) DISPLAY DEVICE

(71) Applicant: LG Display Co., Ltd., Seoul (KR)

(72) Inventor: Yoojin Kang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/126,005

(22) Filed: Dec. 17, 2020

(65) Prior Publication Data

US 2021/0195158 A1    Jun. 24, 2021

(30) Foreign Application Priority Data

Dec. 20, 2019  (KR) .................. 10-2019-0171589

(51) Int. Cl.
*H04N 13/122*     (2018.01)
*H04N 13/385*     (2018.01)
*H04N 13/00*      (2018.01)

(52) U.S. Cl.
CPC ......... *H04N 13/122* (2018.05); *H04N 13/385* (2018.05); *H04N 2013/0081* (2013.01)

(58) Field of Classification Search
CPC .............. H04N 13/122; H04N 13/385; H04N 2013/0081
USPC ......................................................... 348/51
See application file for complete search history.

(56) References Cited

U.S. PATENT DOCUMENTS

| | | | | |
|---|---|---|---|---|
| 2011/0141244 A1* | 6/2011 | Vos | ...................... | G09G 3/3406 348/51 |
| 2012/0050272 A1* | 3/2012 | Iwata | ................... | H04N 13/128 345/419 |
| 2012/0062539 A1* | 3/2012 | Koyama | ................. | G02B 30/24 345/211 |
| 2012/0188235 A1* | 7/2012 | Wu | ........................... | G06T 7/11 345/419 |
| 2012/0257026 A1* | 10/2012 | Lee | ...................... | H04N 13/341 348/55 |
| 2012/0321171 A1* | 12/2012 | Ito | ........................ | H04N 13/239 382/154 |
| 2013/0027390 A1* | 1/2013 | Kim | ........................ | G06T 7/593 345/419 |
| 2013/0027400 A1* | 1/2013 | Kim | ........................ | H04N 13/15 345/426 |
| 2013/0033588 A1* | 2/2013 | Shiomi | ............. | H04N 21/4318 348/58 |
| 2013/0057575 A1* | 3/2013 | An | ........................ | H04N 13/356 345/619 |
| 2013/0120546 A1* | 5/2013 | Sung | .................... | H04N 13/398 348/56 |
| 2013/0258051 A1* | 10/2013 | Gillard | ................. | H04N 13/194 348/43 |

(Continued)

FOREIGN PATENT DOCUMENTS

KR    10-2013-0064090 A    5/2014

*Primary Examiner* — Tung T Vo
(74) *Attorney, Agent, or Firm* — Polsinelli PC

(57) ABSTRACT

A display device comprises a display panel including a plurality of pixels; and a timing controller performing an operation for displaying an image on the display panel, wherein the timing controller includes a second image data converter generating output image data by converting luminance of an object depending on a disparity of the object included in a left eye image and a right eye image for reducing power consumption of a display device by using depth map information of image data is proposed.

18 Claims, 8 Drawing Sheets

(56) References Cited

U.S. PATENT DOCUMENTS

| | | | |
|---|---|---|---|
| 2014/0320552 A1* | 10/2014 | Seo | G09G 3/3648 345/690 |
| 2015/0172622 A1* | 6/2015 | Yoon | H04N 13/341 345/694 |
| 2015/0172644 A1* | 6/2015 | Jung | H04N 13/144 348/51 |
| 2020/0265769 A1* | 8/2020 | Pyo | G09G 3/2003 |
| 2020/0279519 A1* | 9/2020 | Orio | G09G 3/20 |

* cited by examiner

DISPLAY DEVICE

CROSS-REFERENCE TO RELATED APPLICATION

This application claims the benefit of Korean Patent Application No. 10-2019-0171589 filed on Dec. 20, 2019, which is hereby incorporated by reference in its entirety.

BACKGROUND

Field of the Disclosure

The present disclosure relates to a display device and, more particularly, to display device that can reduce power consumption by using depth map information of image data.

Description of the Background

In general, a stereoscopic image representing three dimensions is realized by a principle of stereo vision through both eyes. Since a vision disparity between both eyes exists, that is, both eyes are spaced apart about 65 mm apart, the left and right eyes see slightly different images due to a difference between positions of the both eyes. As described above, a difference in an image due to the difference in the positions of the both eyes is referred to as a binocular disparity. In addition, a three-dimensional stereoscopic image display device uses binocular disparity to allow the left eye to see only a left eye image for the left eye, and the right eye to see only a right eye image for the right eye. Accordingly, the left and right eyes each see different two-dimensional images, and when these two images are transmitted to the brain through the retina, the brain fuses the images to reproduce the sense of depth and realism of the original three-dimensional image. Such a capability is commonly referred to as stereography, and a device applying the stereography to a display device is called a stereoscopic image display device.

The three-dimensional stereoscopic image is generated by combining the two-dimensional images, i.e., the left eye image and the right eye image. In order to generate such a stereoscopic image, information on a stereoscopic disparity, between subjects included in the left eye image and the right eye image, is necessary. This information is included in a depth map. The depth map may be regarded as an image, in which the relative distances of pixels present in the image are represented in a gray scale for making a distinction.

SUMMARY

Accordingly, the present disclosure is to provide a display device that can reduce power consumption by analyzing image data to generate a depth map and adjusting luminance of the image data depending on the depth map information.

A display device according to an exemplary aspect of the present disclosure includes a display panel including a plurality of pixels; and a timing controller performing an operation for displaying an image on the display panel, wherein the timing controller includes a second image data converter generating output image data by converting luminance of an object depending on a disparity of the object included in a left eye image and a right eye image.

The second image data converter may generate the output image data by increasing a luminance reduction amount of the object as the disparity of the object is smaller.

The timing controller may include a first image data converter converting 2D image data into 3D image data including information of the left eye image and the right eye image.

The second image data converter may determine a luminance reduction coefficient value adjusting the luminance of the object with reference to a predetermined look-up table, and may convert the luminance by using the luminance reduction coefficient value to generate the output image data.

The look-up table may include an inflection point mapped to a disparity value, and the second image data converter may generate a luminance reduction curve by linearly connecting the inflection points.

The look-up table may include a plurality of inflection point sets composed for each mode, the timing controller may include a mode setter generating a mode signal that select the inflection point set of the look-up table, and the second image data converter may select the inflection point set depending on the mode signal generated by the mode setter and generate the luminance reduction curve by using the inflection point set.

The look-up table may determine an inflection point value on a basis of a color of a sub-pixel.

The look-up table may have the inflection point value different for each color of the sub-pixel at a same disparity value, the inflection point value of G (green) sub-pixel being greater than the inflection point value of R (red) sub-pixel and the inflection point value of the R (red) sub-pixel being greater than the inflection point value of B (blue) sub-pixel.

The look-up table may determine an inflection point value in proportion to numbers of pixels occupied by the object.

The display device may further include a backlight unit including a plurality of light sources individually emitting light to each of a plurality of blocks that divides the display panel into a grid form, wherein the timing controller may further include a local dimming controller generating a block-by-block backlight dimming signal depending on block-by-block disparity information, and the second image data converter may generate the block-by-block disparity information depending on depth map information to output to the local dimming controller.

The display panel may include a first display area displaying the left eye image and a second display area displaying the right eye image, and the display device may further include a data driver dividing the output image data into the left eye image and the right eye image so as to supply the images to the first display area and the second display area.

BRIEF DESCRIPTION OF THE DRAWINGS

The accompanying drawings, which are included to provide a further understanding of the disclosure and are incorporated in and constitute a part of the present disclosure, illustrate aspects of the disclosure and together with the description serve to explain the principles of the disclosure.

In the drawings.

DETAILED DESCRIPTION

Figure 1:
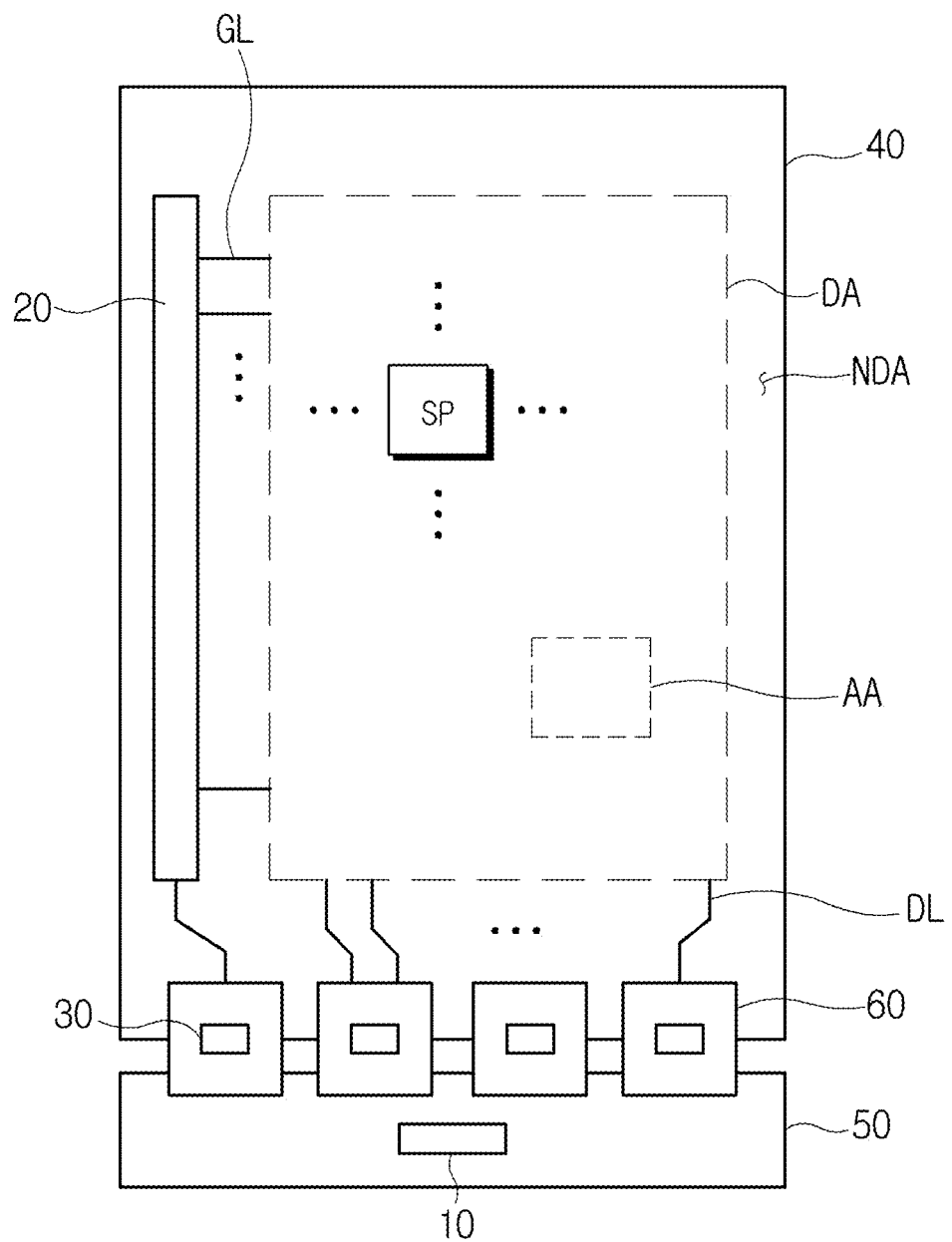
FIG. 1 is a plan view showing a display device according to an exemplary aspect of the present disclosure.

The present disclosure can be modified in various ways and can take many forms, and specific exemplary aspects will be illustrated in the drawings and described in detail in the specification. However, this is not intended to limit the present disclosure to a particular disclosed form. On the contrary, the present disclosure should be understood to include all various modifications, equivalents, and substitutes that may be included within the spirit and technical scope of the present disclosure.

In describing each drawing, similar reference numerals are used for similar components. In the accompanying drawings, the dimensions of the structures are shown to be more enlarged than that of the actual structures for clarity of the present disclosure. It will be understood that, although the terms "first", "second", etc. may be used herein to describe various elements, these elements should not be limited by these terms. These terms are only used for the purpose of distinguishing one element from another element. For example, the first element may be referred to as a second element without departing from the scope of the present disclosure, and similarly, the second element may be referred to as a first element. As used herein, the singular forms are intended to include the plural forms as well, unless the context clearly indicates otherwise.

In the present disclosure, it will be understood that the terms "comprise", "include", "have", etc., when used in this specification, specify the presence of stated features, integers, steps, operations, elements, components, and/or combinations of them, but do not preclude the presence or addition of one or more other features, integers, steps, operations, elements, components, and/or combinations thereof. In addition, it will be understood that when a part such as a layer, a film, a region, or a substrate is referred to as being "on" or "above" another part, it can be directly "on" or "above" the other part, or intervening parts may also be present in the middle thereof. In addition, in the present disclosure, when a part such as a layer, film, region, substrate is referred to as being formed "on" or "above" another part, the formed direction is not limited to an upper direction, but includes a side or lower direction. On the contrary, it will be understood that when a part such as a layer, film, region, or substrate is referred to as being "beneath" or "under" another part, it can be directly "beneath" or "under" the other part, or intervening parts may also be present between a first part and a second part.

Hereinafter, for convenience of description, the stereoscopic image display device according to an exemplary aspect is described as displaying a stereoscopic image, but is not limited thereto, and a stereoscopic image as well as a flat image may be displayed.

In addition, it will be described that the stereoscopic image display device according to the exemplary aspect includes a left eye image and a right eye image. However, the present disclosure is not limited thereto, and may be applied to a stereoscopic image display device that implements multi views having three or more viewpoint images.

In addition, the disparity according to the present disclosure is not distinguished into a positive disparity, a negative disparity, and a zero disparity for convenience of description, and simply represents the size of a screen disparity. For example, a disparity of 3 may mean 3 as a positive disparity, or may mean −3 as a negative disparity.

The display panel is a device for displaying 2D and 3D images, and may be implemented as a flat panel display device such as a liquid crystal display (LCD), a field emission display (FED), a plasma display panel (PDP), and an organic light emitting diode (OLED).

A 3D optical element may be coupled on the display panel. The stereoscopic image display device in the glasses method may be implemented by a polarized glasses method or a shutter glasses method. The 3D optical element is an optical element that divides pixels in the glassless method into sub-pixels viewed through viewer's left eye and sub-pixels viewed through viewer's right eye, and may be an optical component such as a parallax barrier or a lenticular lens. In addition, the 3D optical element may be a pattern retarder or an active retarder that converts polarization characteristics of the left eye image and the right eye image to be different in the glasses method. The parallax barrier and the lenticular lens may be implemented as a switchable barrier or a switchable lens that is electrically controlled using a liquid crystal panel.

FIG. 1 is a plan view showing a display device according to the exemplary aspect of the present disclosure.

The display device 1 is a device for displaying an image, and may be a self-luminous display device such as an organic light emitting display, or may be a non-luminous display device such as a liquid crystal display (LCD), an electrophoretic display (EPD), and an electro-wetting display (EWD).

The display device 1 may be implemented in various forms. For example, the display device 1 may be implemented in a rectangular plate shape. However, the technical idea of the present exemplary aspect is not limited thereto, and the display device 1 may have various shapes such as a square shape, a circular shape, an elliptical shape, and a polygonal shape, and a part of the corner may be formed as a curved surface or may have a shape in which the thickness is changed in at least one area. In addition, all or part of the display device 1 may have flexibility.

The display device 1 displays a 2D image in 2D mode, and a 3D image in 3D mode.

The display device 1 may be used in a wearable display device capable of displaying virtual reality (VR) content. The wearable display device may use a head mounted display (HMD) method or a glasses method, which are worn directly on the head.

Referring to FIG. 1, the display device 1 includes a timing controller 10, a gate driver 20, a data driver 30, and a display panel 40.

The timing controller 10 may receive an image signal and a control signal from the outside. The image signal may include a plurality of gray scale data. The control signal may include, for example, a horizontal synchronization signal, a vertical synchronization signal, and a main clock signal.

The timing controller 10 may properly handle the image signal and the control signal depending on operating conditions of the display panel 40 so as to generate and output image data, a gate drive control signal, and a data drive control signal.

The timing controller 10 may be mounted on a circuit board 50. The circuit board 50 may include a plurality of circuits mounted thereon and implemented with a driving chip, including the timing controller 10. The circuit board 50 may be a printed circuit board or a flexible printed circuit board, but the kind of the circuit board 50 is not limited thereto.

The circuit board 50 on which the timing controller 10 is mounted may be attached to the display panel 40 through a flexible film 60. The flexible film 60 has one end attached to the display panel 40 and the other end attached to the circuit board 50, so that the display panel 40 and the circuit board 50 may be electrically connected to each other. The flexible film 60 may include a plurality of wirings for electrically connecting pads (not shown) formed on the display panel 40 and wirings of the circuit board 50 to each other. In the exemplary aspect, the flexible film 60 may be attached on the pads through an anisotropic conducting film (ACF).

The gate driver 20 may be electrically connected to sub-pixels sP of the display panel 40 through a plurality of gate lines GL. The gate driver 20 may generate gate signals on the basis of the gate drive control signal provided from the timing controller 10. The gate driver may provide the generated gate signals to the sub-pixels sP through the plurality of gate lines GL.

In the exemplary aspect, the gate driver 20 may be formed in a non-display area NDA of the display panel 40 by a gate in panel (GIP) method. In such an exemplary aspect, in the non-display area NDA of the display panel 40, the gate driver 20 may be disposed adjacent to one side or both sides of the display area DA. In another exemplary aspect, a gate driver 20 is made of a separate driving chip, not by the gate in panel method, and mounted on a flexible film, etc., and may be attached to the non-display area NDA in a tape automated bonding (TAB) method.

The data driver 30 may be connected to sub-pixels sP of the display panel 40 through a plurality of data lines DL. The data driver 30 may generate data signals on the basis of the image data and the data drive control signal, which are supplied from the timing controller 10. The data driver 30 may provide the generated data signals to sub-pixels SP through the plurality of data lines DL.

When the data driver 30 is made of the driving chip, the data driver 30 may be mounted on the flexible film 60 in a chip on film (COF) or a chip on plastic (COP) method. The data driver 30 may output the data signal to the data lines DL through the pads connected through the flexible film 60.

The display panel 40 includes the display area DA and the non-display area NDA. The display area DA is an area in which sub-pixels sP are disposed, and may be referred to as an active area. The non-display area NDA may be disposed around the display area DA. For example, the non-display area NDA may be disposed along the border of the display area DA. The non-display area NDA may comprehensively refer to areas other than the display area DA on the display panel 40, and may be referred to as a non-active area.

The sub-pixels SP may be arranged in a matrix form on the display panel 40, for example. Each sub-pixel sP may be electrically connected to the corresponding gate line GL and data line DL. The sub-pixels SP may emit light with luminance corresponding to the gate signal and the data signal, respectively supplied through the gate lines GL and the data lines DL.

Each sub-pixel sP may display any one of the first to third colors. In the exemplary aspect, each sub-pixel sP may display any one of red, green, and blue colors. In another exemplary aspect, each sub-pixel sP may display any one of cyan, magenta, and yellow colors. In various exemplary aspects, the sub-pixels sP may be configured to display any one of four or more colors. For example, each sub-pixel sP may display any one of red, green, blue, and white colors.

In the non-display area NDA, the gate driver 20 may be provided, for example, as a driver for driving the sub-pixel sP. In addition, a plurality of pads electrically connected to the data driver 30 and/or the circuit board 50 through the flexible film may be provided in the non-display area NDA. The pads are not covered by an insulating layer, and may be exposed to the outside of the display panel 40 to be electrically connected to the data driver 30 and the circuit board 50 described above.

Figure 2:
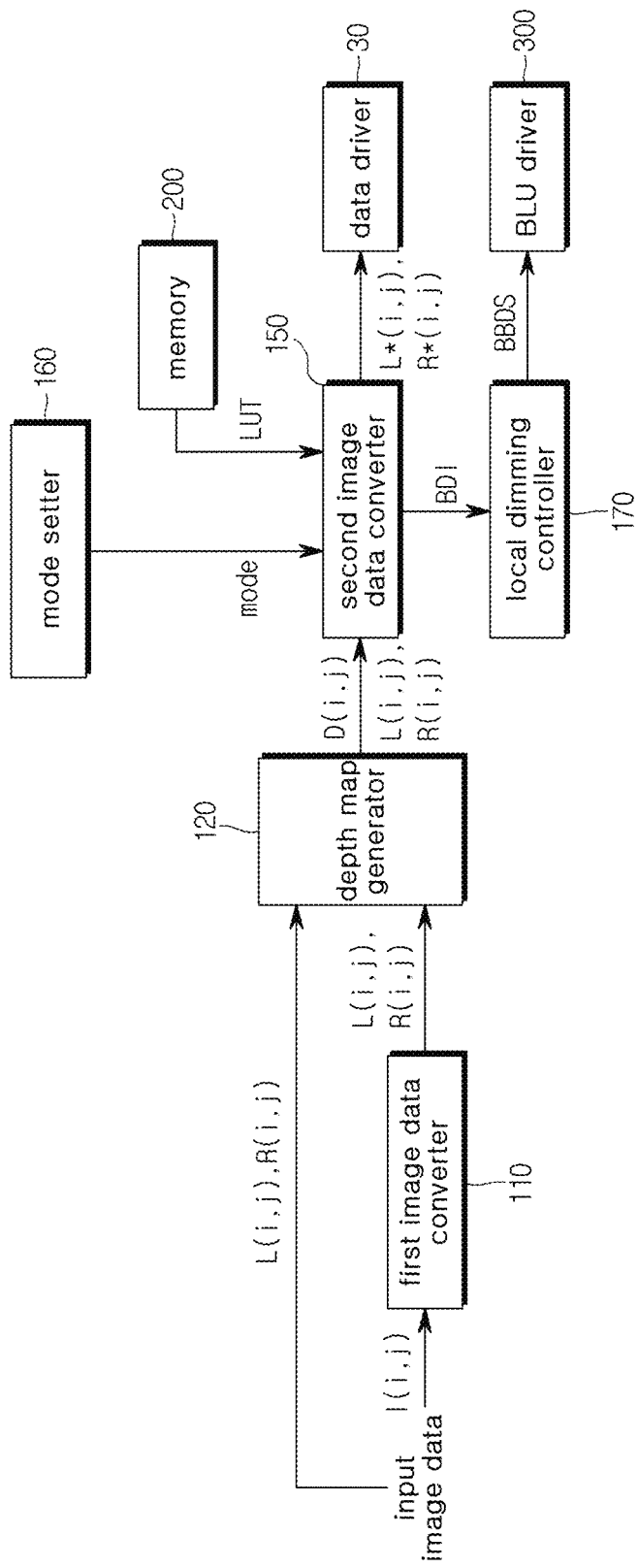
FIG. 2 is a block diagram of a timing controller according to the exemplary aspect of the present disclosure.

FIG. 2 is a block diagram of a timing controller according to the exemplary aspect of the present disclosure.

The timing controller 10 analyzes the input image data to generate a depth map, converts the image data so that luminance is adjusted based on the depth map information, and outputs the image data to the data driver 30. In addition, when the display device is composed of a backlight unit (BLU) and a liquid crystal display (LCD), the timing controller 10 converts image data so that the luminance is adjusted based on the depth map information, and outputs the image data to the data driver 30. In addition, a dimming signal (BBDS) of the backlight unit (BLU) is output to a backlight unit (BLU) driver.

The display device according to the exemplary aspect includes the timing controller 10 that converts and outputs the luminance of the input image data on the basis of the depth map information, thereby reducing power consumption and improving a sense of presence on image. In addition, when the timing controller 10 is used in a stereoscopic image display device such as a wearable display device capable of displaying virtual reality (VR) content, there is an effect of further maximizing the sense of presence on a stereoscopic image.

When the timing controller 10 according to the exemplary aspect is described with reference to FIG. 2, the timing controller 10 includes a first image data converter 110, a depth map generator 120, and a second image data converter 150, a mode setter 160, and a local dimming controller 170.

The first image data converter 110 converts 2D input image data I(i,j) into 3D input image data (L(i,j), R(i,j)). In order to generate the depth map in the depth map generator 130, left eye image and right eye image information is required, because the 3D input image data (L(i,j), R(i,j)) having the left eye image and right eye image information are necessary in the case where the input image data is 2D I(i,j).

A method of converting 2D input image data I(i,j) into 3D input image data (L(i,j), R(i,j)) uses a human perspective learning effect, wherein the 2D image data is converted into the 3D image data. The method includes a modeling technique, a motion estimation technique, etc. The modeling technique is a method of converting a 2D image into a 3D image by using scenography, and predicts depth information by using boundary information (or contour information) and contrast information of the 2D input image. The modeling technique is useful for still images and the algorithm is relatively simple. The motion estimation method is a method of converting a 2D image into a 3D image by using a motion parallax, and predicts depth information from the movement of objects between neighboring frames.

The first image data converter 110 generates left eye image data L(i,j) and right eye image data R(i,j) from 2D input image data I(i,j). The 2D-3D image conversion method according to the exemplary aspect of the present disclosure converts 2D image into 3D image, and thus the method is applicable to any stereoscopic image display device that implements the binocular disparity, between a left eye image and a right eye image, on the basis of a depth value.

The depth map generator 120 analyzes a disparity from 3D image data to generate a depth map. The 3D image data includes a left eye image signal L(i,j) and a right eye image signal R(i,j). The left eye image signal L(i,j) and the right eye image signal R(i,j) contain luminance information of each pixel, and the luminance is a predetermined number, for example, the gray scale has a value of 1024 (=210), 256 (=28), or 64 (=26). The disparity D(i,j) means, for an object, a difference between a position of the object on the retina of the left eye and a position of the object on the retina of the right eye. The depth is determined by the size of the disparity. Here, the disparity means, for an object, the difference between the position of the object in the left eye image and the position of the object in the right eye image, that is, the difference in coordinates.

The object is defined as an object recognizable independently, which is distinctive from each other, such as an animal, a plant, an automobile, a ship, and an aircraft. Each object may include detailed objects that are independently recognized. The detailed objects are defined as object-dependent targets, which are not present on a flat surface within the object. For example, a human face includes a plurality of detailed objects, which are not present on the flat surface, such as an eye, nose, or chin. In addition, a person has the detailed objects such as arms and legs, which are not present on the flat surface with the body, depending on movement.

By finding matching points in two images of the same scene, the depth map represents the differences between these points and indicates where each point of a reference image appears on a corresponding image. At this time, either the left eye image or the right eye image becomes the reference image, and the other one becomes the corresponding image.

The depth map generator 120 generates a depth map, for a left eye image and a right eye image, by using a block matching algorithm (BMA). To be more specific, one of the left eye image L(i,j) and the right eye image R(i,j) is determined as a reference image according to the block matching algorithm (BMA), and a block of a certain size is designated to the reference image. In addition, the depth map generator 120 finds coordinates of the block corresponding to the reference image from another image, and represents a difference in block positions between the two images as the depth map.

Figure 3:
FIG. 3 is a view showing a left eye image.
Figure 4:
FIG. 4 is a view showing a right eye image.
Figure 5:
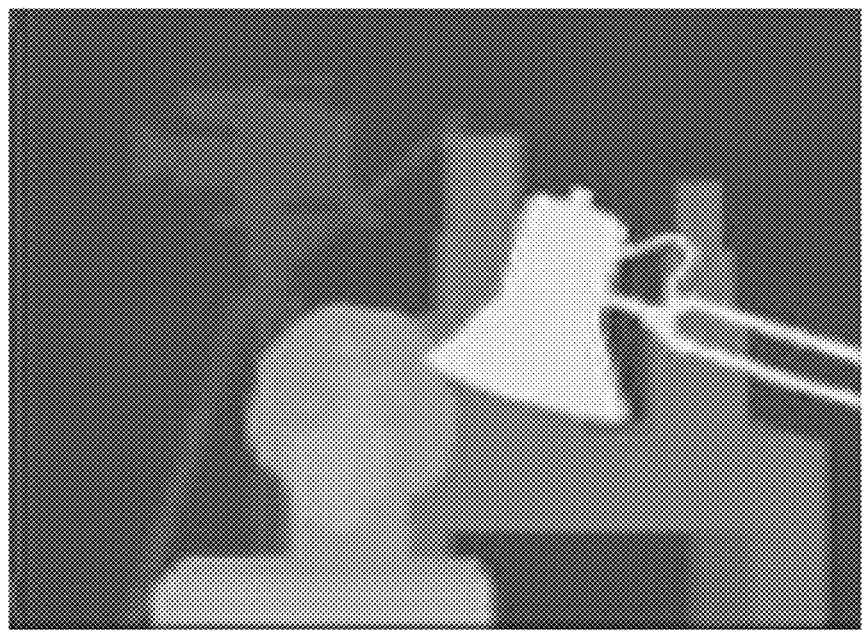
FIG. 5 is an image of a depth map generated using the images of FIGS. 3 and 4.

The depth map generator 120 may generate the depth map as shown in FIG. 5, when the left eye image shown in FIG. 3 and the right eye image shown in FIG. 4 are input. The depth map may be regarded as an image in which the relative distances of pixels present in the image are represented by distinguishing in a gray scale. A detailed description of depth map generation of the depth map generator 120 will be described later with reference to FIG. 6.

Depending on a disparity D(i,j) of an object included in a left eye image L(i,j) and a right eye image R(i,j), the second image data converter 150 converts luminance of the object, and generates output image data (L*(i,j), R*(i,j)) to transmit to the data driver 30. The disparity D(i,j) means, for an object, a difference between a position of the object on the retina of the left eye and a position of the object on the retina of the right eye, and is included in the depth map information generated by the depth map generator 120.

The second image data converter 150 may convert the luminance of the input image data (L(i,j), R(i,j)) on the basis of the luminance conversion curve, and generate the output image data (L*(i,j), R*(i,j)). A plurality of luminance conversion curve may be provided. The luminance conversion curve by which the second image data converter 150 uses for converting the luminance of the input image data (L(i,j), R(i,j)) may be determined depending on mode signals generated by the mode setter 160. The luminance conversion curve may be generated based on the inflection point sets of the look-up table previously stored in the memory 200. The luminance conversion curve according to the exemplary aspect may be generated by linearly connecting each inflection point included in the inflection point set.

The output image data (L*(i,j), R*(i,j)) generated by the second image data converter 150 are transmitted to the data driver 30. The data driver 30 generates a data signal on the basis of the luminance-converted output image data (L*(i,j), R*(i,j)) and a data drive control signal. By distinguishing the left eye image data L*(i,j) and the right eye image data R*(i,j), the data drive control signal may control the luminance-converted output image data (L*(i,j), R*(i,j)). The data driver 30 provides the generated data signals to sub-pixels sP of the display panel through data lines. The data driver 30 may respectively supply the left eye image data L*(i,j) to the left eye image display pixel L_sP, and the right eye image data R*(i,j) to the right eye image display pixel R_sP.

The left eye image display pixel L_sP may be disposed in the first display area of the display panel, and the right eye image display pixel R_sP may be disposed in the second display area of the display panel. The left eye image display pixel L_sP and the right eye image display pixel R_sP may be arranged in various forms on the display panel of the 3D stereoscopic image display device. When the stereoscopic image display device is implemented by a wearable display device such as a head mounted display (HMD) method, a glasses method, or the like, the left eye image display pixel L_sP may be disposed on the left eye display panel adjacent to the left eye, and the right eye image display pixel R_sP may be disposed on the right eye display panel adjacent to the right eye.

A detailed process, in which the second image data converter 150 converts the image data, will be described later with reference to FIGS. 7 and 8.

In addition, the second image data converter 150 may generate block-by-block disparity information (BDI) depending on the depth map information to output to the local dimming controller 170. The second image data converter 150 extracts depth data for each pixel from the image data, maps the depth data with the depth map for each block corresponding to each of the plurality of blocks, and then generates the block-by-block disparity information (BDI) depending on the depth map for each block. The block-by-block disparity information (BDI) may be used for the local dimming control in a display device composed of a backlight unit (BLU) and a liquid crystal display (LCD). The block-by-block disparity information (BDI) generated by the second image data converter 150 is transmitted to the local dimming controller 170, and the local dimming controller 170 corrects dimming values for each block depending on the block-by-block disparity information (BDI) to generate a block-by-block backlight dimming signal (BBDS).

The mode setter 160 generates a mode signal that selects an inflection point set of the look-up table pre-stored in the memory 200. The luminance conversion curve used for image data conversion is determined in the second image data converter 150 depending on the mode signal generated by the mode setter 160. The mode setter 160 may be implemented by a user interface. The user may view an original image as it is, depending on a selection, or may determine a degree of enhancement of a luminance contrast ratio between the front object and the rear object, through the mode selection.

The local dimming controller 170 may be included in the timing controller 10 when the display device is composed of a backlight unit (BLU) and a liquid crystal display (LCD).

The local dimming controller 170 corrects the dimming value for each block depending on the block-by-block disparity information (BDI), provided from the second image data converter 150, to generate a block-by-block backlight dimming signal (BBDS).

The backlight unit (BLU) includes a plurality of light sources that individually emit light to each of a plurality of blocks that divides the liquid crystal display panel into a grid form.

Each of the plurality of light sources may be made of a light emitting diode (LED), and each block includes at least one light source. Each of the plurality of light sources is individually driven in each block unit depending on the driving of the backlight unit driver 300, and emits luminance-controlled light to each area of the liquid crystal display panel overlapped on each block.

The backlight unit driver 300 drives each light source in each block unit depending on the block-by-block backlight dimming signal (BBDS) provided from the local dimming controller 170, so that the luminance-adjusted light is emitted to each area of the liquid crystal display panel overlapped on each block.

The second image data converter 150 may generate the block-by-block disparity information (BDI) depending on the depth map information. After extracting the depth data for each pixel from the image data and mapping to the depth map for each block corresponding to each of the plurality of blocks, the block-by-block disparity information (BDI) may be generated depending on the depth map for each block.

The local dimming controller 170 analyzes the image data (L*(i,j), R*(i,j)) to be displayed in each of the plurality of blocks, and generates dimming values for each block for driving the plurality of light sources in each block unit. In addition, the local dimming controller 170 generates a block-by-block backlight dimming signal (BBDS) depending on the block-by-block disparity information (BDI) provided from the second image data converter 150.

Figure 6:
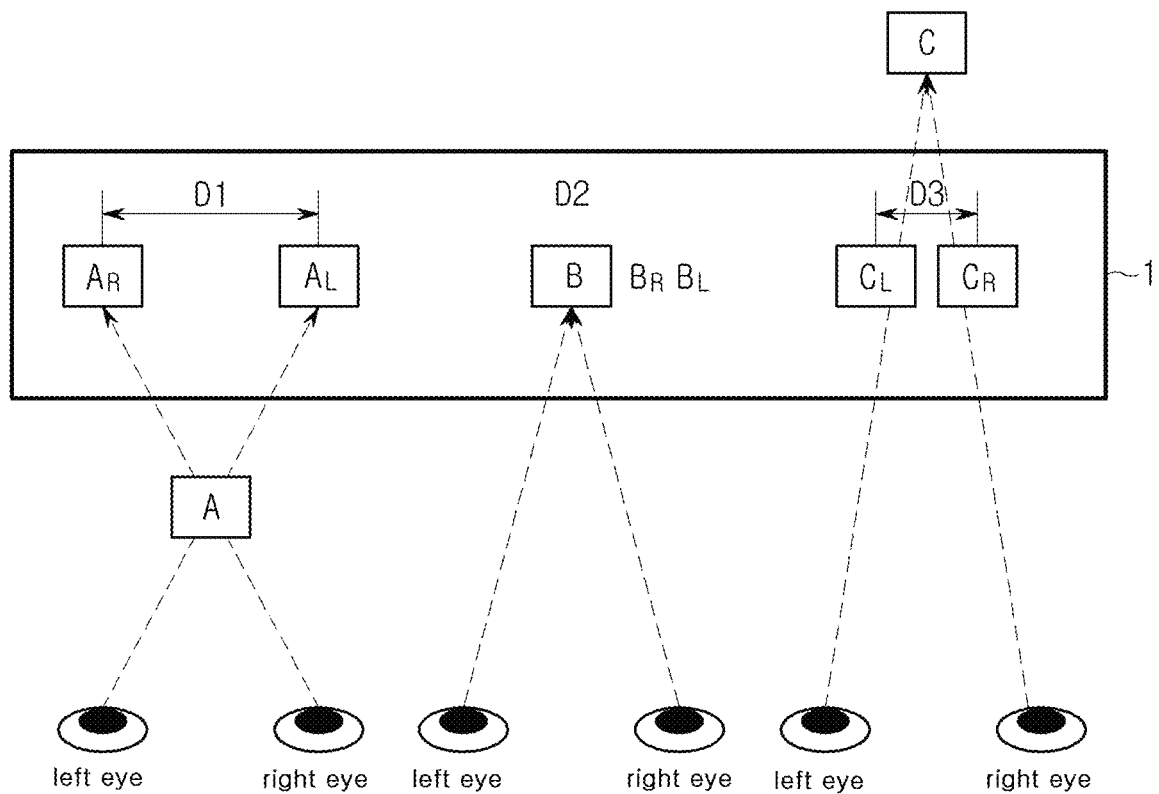
FIG. 6 is a view showing a method of analyzing a disparity of an object included in the left eye image and the right eye image according to the exemplary aspect of the present disclosure.

FIG. 6 is a view showing a method of analyzing a disparity of an object included in the left eye image and the right eye image according to the exemplary aspect.

Referring to FIG. 6, describing the generation of the depth map of the depth map generator 120 in more detail, a first object included in the left eye image AL and a first object included in the right eye image AR enable a user to recognize the first object A. The first object included in the left eye image AL and the first object included in the right eye image AR are separated apart by a first position difference value D1. Since the right direction of a screen is a positive direction, the first position difference value D1 resulting from subtracting the position value of the first object included in the left eye image AL and the position value of the first object included in the right eye image AR becomes a positive value.

A second object included in the left eye image BL and a second object included in the right eye image BR enable the user to recognize the second object B. Since the second object included in the left eye image BL and the second object included in the right eye image BR are displayed at the same location, the second location difference value D2 becomes 0.

A third object included in the left eye image CL and a third object included in the right eye image CR enable the user to recognize the third object C. The third object included in the left eye image CL and the third object included in the right eye image CR are separated apart by a third position difference value D3. Since the right direction of the screen is the positive direction, the third position difference value D3 resulting from subtracting the position value of the third object included in the left eye image CL and the position value of the third object included in the right eye image CR becomes a negative value.

When the difference value between the position value of the object included in the left eye image and the position value of the object included in the right eye image is a positive value, the object is recognized as being close to the user, that is, the object is recognized as existing at a position protruding from the display device (i.e., front object).

In addition, when the difference value between the position value of the object included in the left eye image and the position value of the object included in the right eye image is a negative value, the object is recognized as being far from the user, that is, the object is recognized as being positioned inside the display device (i.e., rear object).

The depth map is an image in which the disparity, a relative distance of pixels present in the image, is represented by distinguishing in a gray scale. That is, the depth map may be generated by distinguishing: the first object A having the positive value D1 as the lightest gray value; the second object B having the D2 value as 0 as the middle gray value; and the third object C having the negative value D3 as the darkest gray value. Therefore, the depth map includes disparity value information of each object.

Figure 7:
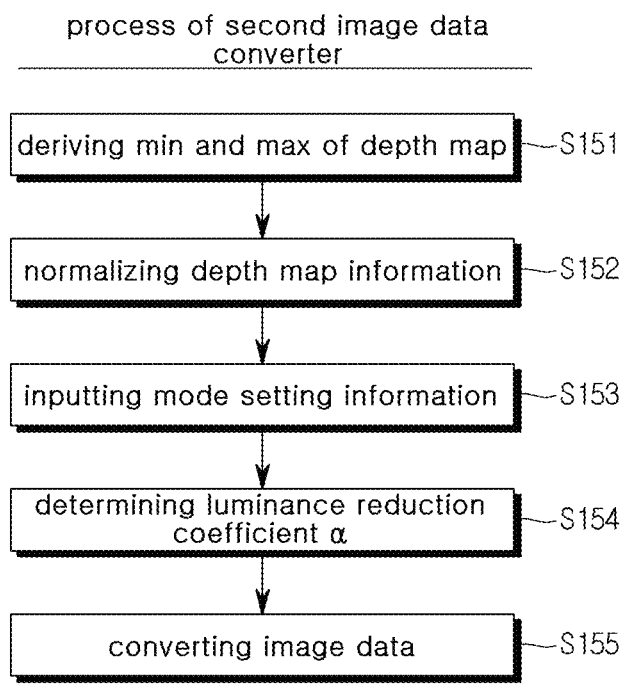
FIG. 7 is a flowchart showing a process in which a second image data converter 150 converts image data.

FIG. 7 is a flowchart showing a process in which the second image data converter 150 converts image data. FIG. 8 is a view showing a luminance conversion curve according to the exemplary aspect of the present disclosure.

The process, in which the second image data converter 150 converts the image data, will be described in detail with reference to FIGS. 7 to 8.

First, in S151, the second image data converter 150 derives minimum (min) and maximum (max) disparity values of depth map information from a frame image information. The disparity value may have a negative value. The minimum (min) value of the depth map information is considered not only the size but also the sign, and the minimum (min) value may have a negative value.

As a next step, in S152, the second image data converter 150 normalizes the depth map information. The normalized disparity D_n(i,j) is equal to [Equation 1].

$$D\_n(i, j) = \frac{D(i, j) - \min}{\max - \min} \quad \text{[Equation 1]}$$

where i and j are positions of a pixel,
D(i,j) is a disparity value, between a left eye image and a right eye image, at i,j pixels.

In the next step, in S153, the second image data converter 150 receives mode setting information from the mode setter 160.

In the next step, in S154, the second image data converter 150 determines a luminance reduction coefficient α by using a look-up table pre-stored in a memory 200. The look-up table maps the inflection point with the normalized disparity D_n(i,j). The luminance reduction coefficient α is determined depending on the value of the disparity D(i,j) or the normalized disparity D_n(i,j). The luminance reduction coefficient α has a value in which a plurality of the inflection points are linearly connected. The luminance reduction coefficient α may be configured to be reduced step by step as the disparity of the object is smaller, thereby maximizing the sense of presence on the stereoscopic image represented in the stereoscopic image display device. In addition, power consumption of the display device may be reduced due to a decrease in luminance. The luminance reduction coefficient α may be greater than 0, and less than or equal to 1. In the luminance conversion curve shown in FIG. 8, the horizontal axis is the normalized value of disparity D_n(i,j), and the vertical axis is the value of the luminance reduction coefficient α.

Figure 8:
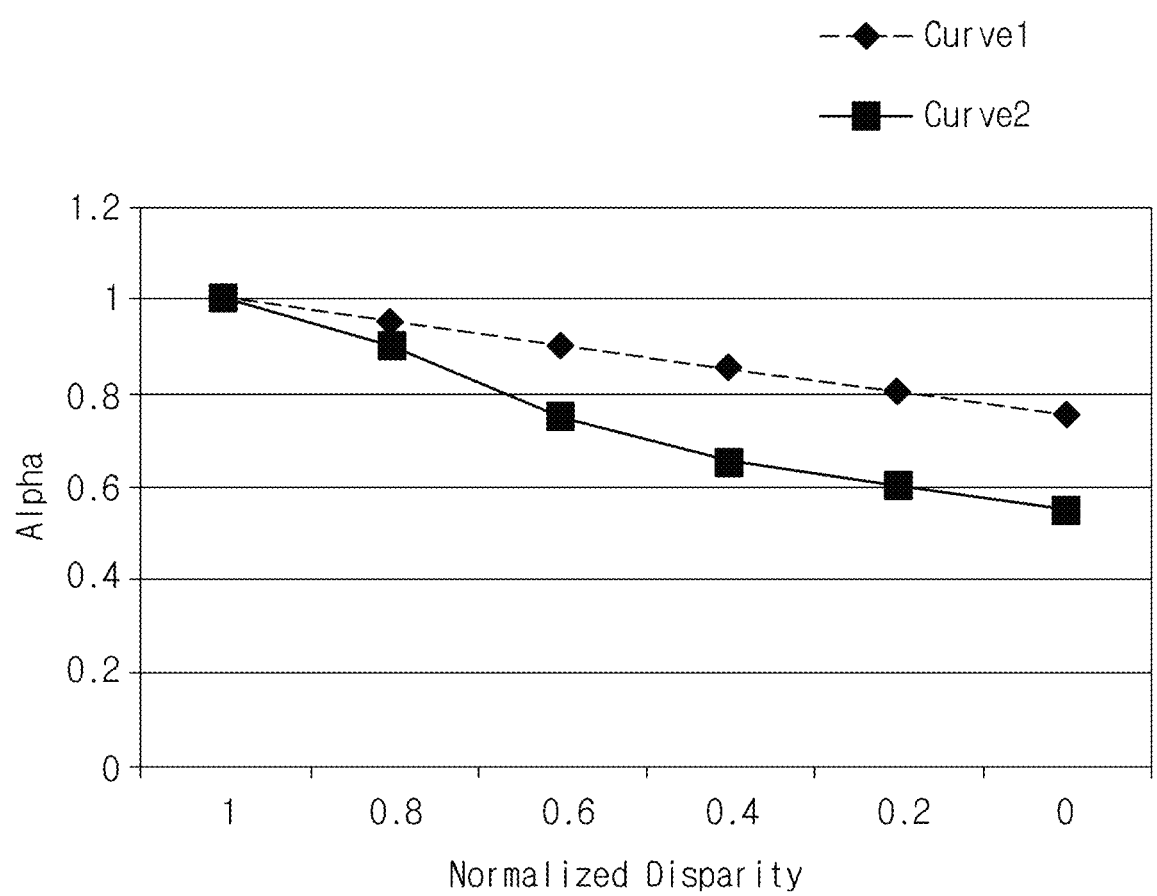
FIG. 8 is a view for a luminance conversion curve according to the exemplary aspect of the present disclosure.

FIG. 8 shows that each inflection point of the luminance conversion curves 1 and 2 is linearly connected, but this is merely an example and the present disclosure is not limited thereto. In addition, it is also possible to generate a luminance conversion curve in various ways such that each inflection point is connected to a second to Nth order curve.

Table 1 is a look-up table in which the inflection points of the luminance conversion curves 1 and 2 are mapped with the normalized disparity D_n(i,j). The look-up table includes a plurality of inflection point sets composed for each mode. Table 1 is composed of two sets of inflection points, and the rows of curve 1 and curve 2 each compose a set of inflection points.

TABLE 1

| Normalized Disparity | Curve1 | Curve2 |
|---|---|---|
| 1 | 1 | 1 |
| 0.8 | 0.95 | 0.9 |
| 0.6 | 0.9 | 0.75 |
| 0.4 | 0.85 | 0.65 |
| 0.2 | 0.8 | 0.6 |
| 0 | 0.75 | 0.55 |

Generating a luminance conversion curve and a look-up table for a normalized disparity D_n(i,j) is an example, and the luminance conversion curve may be generated as a relational graph of the luminance reduction coefficient α with respect to the disparity D(i,j). The look-up table may also be configured to be generated as a table in which the disparity D(i,j) and the inflection point are mapped with each other.

The luminance reduction coefficient α for the normalized disparity D_n(i,j) may be experimentally derived in consideration of a degree of power consumption reduction and a degree of cognitive deterioration of a display device user.

When the luminance conversion curve 1 and 2 are compared with each other, the luminance reduction coefficient α of the curve 1 is gradually reduced than that of the curve 2. The curve 2 improves the luminance contrast ratio of the front object and the rear object, thereby maximizing the sense of presence on image and simultaneously reducing power consumption as much as possible.

As a next step, in S155, the second image data converter 150 converts the image data by using the determined luminance reduction coefficient α. The converted image data (L*(i,j), R*(i,j)) are as shown in Equation 2.

$$L^*(i,j)=\alpha\cdot L(i,j); R^*(i,j)=\alpha\cdot R(i,j); 0<\alpha\leq 1 \qquad \text{[Equation 2]}$$

The luminance reduction coefficient α may have a value greater than 0, and less than or equal to 1.

Meanwhile, in determining an inflection point value mapped to the look-up table, a color of a sub-pixel may be taken into consideration. For example, when one pixel is composed of sub-pixels of R (red), G (green), and B (blue), the inflection point value for the sub-pixels of R and B may be lowered than the inflection point value for the sub-pixels of G. The reason is that the human eyes are most sensitive to G (green), then R (red), and a degree of response to B (blue) is relatively low. A luminance reduction coefficient α value may be determined so that a pixel for G (green) corresponds to the luminance conversion curve 1, and pixels for R (red) and B (blue) correspond to the luminance conversion curve 2.

In addition, in determining the inflection point value mapped to the look-up table, the number of pixels occupied by the object may be taken into consideration. When the pixel area occupied by the object is large, the luminance control may cause a sense of difference to the user. Therefore, a larger inflection point value may be mapped to the look-up table so that the luminance reduction coefficient α is larger as the pixel area occupied by the object is larger.

The mode setter 160 generates a mode signal that selects an inflection point set of the look-up table pre-stored in the memory 200. The mode setter 160 may be implemented by a user interface. The user may view an original image as it is, depending on the selection, or may determine the degree of enhancement of the luminance contrast ratio between the front object and the rear object, through the mode selection.

For example, mode 0 may be an inflection point set in which all the inflection point values have integer 1. In the mode 0, the display device outputs the original image as it is. Mode 1 may be an inflection point set corresponding to the curve 1. The mode signal, mode 2, may be an inflection point set corresponding to the curve 2. When the user wants to maximize the luminance contrast ratio between the front object and the rear object, and maximally reduce power consumption, the mode 2 may be selected. The numbers of mode and the numbers of inflection point set of the look-up table may be variously configured depending on the manufacturer's selection.

According to various exemplary aspects, the display device may have various shapes such as a rectangular plate shape, a square shape, a circular shape, an elliptical shape, and a polygonal shape. The display device may display a 2D image and a 3D image, and may be used in a wearable display device capable of displaying virtual reality (VR) content.

In the various exemplary aspects introduced in the present disclosure, a front object maintains luminance and a rear object reduces the luminance to display images on the basis of depth (or disparity) information of the object, prepared by analyzing the input image data. As a result, the display device of the present disclosure has an effect of reducing power consumption and increasing the sense of presence on image.

When a technical idea of analyzing input image data to maintain luminance of the front object and reducing the luminance of the rear object to display the image, particularly introduced in this disclosure, is used in a stereoscopic image display device such as a wearable display device capable of displaying virtual reality (VR) content, the sense of presence on the stereoscopic image may be further maximized, because the image is displayed by way of reducing the luminance of the rear object that is relatively blurry in the stereoscopic image.

The exemplary aspects described above are to be understood in all respects as illustrative and not restrictive. The scope of the present disclosure is indicated by the following claims rather than the above detailed description, and all changes or modifications derived from the meaning and scope of the claims and equivalent concepts should be interpreted as being included in the claims of the present disclosure.

Although aspects have been described with reference to a number of illustrative aspects thereof, it should be understood that numerous other modifications and aspects can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel including a plurality of pixels; and
a timing controller performing an operation for displaying an image on the display panel,
wherein the timing controller includes a second image data converter generating output image data by converting luminance of an object depending on a disparity value of the object included in a left eye image and a right eye image, a mode setter generating a mode signal and a look-up table including a plurality of inflection point values mapped to the disparity value, and
wherein the second image data converter configured to:
derive minimum and maximum disparity values of depth map information from a frame image information,
normalize the depth map information based on the minimum and maximum disparity values,
receive the mode signal including a mode setting information from the mode setter, determine a luminance reduction coefficient by using the look-up table,
convert the luminance of the object by using the determined luminance reduction coefficient, and
generate the output image data for the display panel; and
wherein the timing controller comprises a first image data converter converting two-dimensional (2D) image data into three-dimensional (3D) image data including information of the left eye image and the right eye image.

2. The display device of claim 1, wherein the second image data converter generates the output image data by increasing a luminance reduction amount of the object as the disparity of the object gets smaller.

3. The display device of claim 1, wherein the second image data converter generates a luminance reduction curve by linearly connecting the plurality of inflection points.

4. The display device of claim 3, wherein the look-up table includes a plurality of inflection point sets composed for each mode,
the mode signal selects the inflection point set of the look-up table, and
the second image data converter selects the inflection point set depending on the mode signal generated by the mode setter and generates the luminance reduction curve by using the inflection point set.

5. The display device of claim 3, wherein the look-up table determines an inflection point value based on a color of a sub-pixel in the display panel.

6. The display device of claim 5, wherein the look-up table has the inflection point value different for each color of the sub-pixel at a same disparity value, the inflection point value of G (green) sub-pixel being greater than the inflection point value of R (red) sub-pixel and the inflection point value of the R (red) sub-pixel being greater than the inflection point value of B (blue) sub-pixel.

7. The display device of claim 3, wherein the look-up table determines an inflection point value in proportion to numbers of pixels occupied by the object.

8. The display device of claim 1, further comprising a backlight unit including a plurality of light sources individually emitting light to each of a plurality of blocks that divides the display panel into a grid form,
wherein the timing controller further includes a local dimming controller generating a block-by-block backlight dimming signal depending on block-by-block disparity information, and
wherein the second image data converter generates the block-by-block disparity information depending on depth map information to output to the local dimming controller.

9. The display device of claim 1, wherein the display panel comprises a first display area displaying the left eye image and a second display area displaying the right eye image, and
wherein the display device further comprises a data driver dividing the output image data into the left eye image and the right eye image so as to supply the images to the first display area and the second display area.

10. A display device comprising:
a first image data converter converting two-dimensional (2D) image data into three-dimensional (3D) image data including information of a left eye image and a right eye image;
a depth map generator analyzing a disparity value of an object included in the left eye image and the right eye image from the 3D image data and generating depth map information;
a second image data converter generating output image data by converting luminance of the object depending on the disparity value;
a mode setter generating a mode signal;
a look-up table including a plurality of inflection point values mapped to the disparity value,
wherein the second image data converter configured to:
derive minimum and maximum disparity values of depth map information from a frame image information,
normalize the depth map information based on the minimum and maximum disparity values,
receive the mode signal including a mode setting information from the mode setter,
determine a luminance reduction coefficient by using the look-up table,
convert the luminance of the object by using the determined luminance reduction coefficient, and generate the output image data; and
a display panel including first and second display areas and displaying a 3D image based on the output image data.

11. The display device of claim 10, further comprising a backlight unit including a plurality of light sources individually emitting light to each of a plurality of blocks that divides the display panel into a grid form.

12. The display device of claim 10, further comprising a local dimming controller generating a block-by-block backlight dimming signal depending on block-by-block disparity information.

13. The display device of claim 12, wherein the block-by-block disparity information is generated from the second image data converter in accordance with the depth map information to output to the local dimming controller.

14. The display device of claim 10, wherein the look-up table determines the inflection point values in proportion to numbers of pixels occupied by the object.

15. The display device of claim 10, wherein the look-up table determines the inflection point values in proportion to numbers of pixels occupied by the object.

16. The display device of claim 10, wherein the look-up table determines the inflection point values based on a color of a sub-pixel in the display panel.

17. The display device of claim 10, wherein the left eye image is displayed at the first display area and the right eye image is displayed at the second display area.

18. The display device of claim 17, further comprising a data driver dividing the output image data into the left eye image and the right eye image so as to supply the images to the first display area and the second display area.

* * * * *